US012729071B1

(12) United States Patent
Li et al.

(10) Patent No.: US 12,729,071 B1
(45) Date of Patent: Sep. 8, 2026

(54) AUTOMATED PROBLEM SOLVE WORKFLOWS FOR SHUTTLE RAIL SYSTEMS

(71) Applicant: Amazon Technologies, Inc., Seattle, WA (US)

(72) Inventors: Diya Li, Bellevue, WA (US); Kenneth Edward Cecka, Bainbridge Island, WA (US); Nadeem Hasan Syed, Mill Creek, WA (US); Bo Liu, Toronto (CA); Aneek Mukherjee, Seattle, WA (US); Manfredi Soldano, Merate (IT)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 18/535,181

(22) Filed: Dec. 11, 2023

(51) Int. Cl.
*B65G 43/10* (2006.01)
*B65G 47/50* (2006.01)

(52) U.S. Cl.
CPC ............. *B65G 43/10* (2013.01); *B65G 47/50* (2013.01)

(58) Field of Classification Search
CPC ................................ B65G 43/10; B65G 47/50
See application file for complete search history.

(56) References Cited

U.S. PATENT DOCUMENTS

| | | | | |
|---|---|---|---|---|
| 11,628,477 | B1 * | 4/2023 | De La Rosa | B25J 19/023 209/509 |
| 2007/0126578 | A1 * | 6/2007 | Broussard | G06Q 10/087 705/28 |
| 2009/0050541 | A1 * | 2/2009 | Berdelle-Hilge | B65H 31/30 209/552 |
| 2017/0132561 | A1 * | 5/2017 | High | G06T 7/73 |
| 2017/0157649 | A1 * | 6/2017 | Wagner | B07C 3/02 |
| 2019/0233213 | A1 * | 8/2019 | Phan-Quiroga | B65G 1/0492 |
| 2019/0311325 | A1 * | 10/2019 | Reblin | G06Q 10/0836 |
| 2021/0094073 | A1 * | 4/2021 | Volta | B66F 9/063 |

* cited by examiner

*Primary Examiner* — Michael Collins
(74) *Attorney, Agent, or Firm* — Eversheds Sutherland (US) LLP

(57) ABSTRACT

Systems and methods are disclosed for automated problem solve workflows for shuttle rail systems and related container movement devices. In one embodiment, an example system may include a shuttle and a controller. The controller may be configured to determine that the shuttle has a first item onboard, where the shuttle is configured to deliver the first item to a first location, determine that the first item was not delivered to the first location, and cause the shuttle to be routed to a problem solve station. The controller may be configured to determine a first container at which the shuttle is to unload the first item at the problem solve station, and cause the shuttle to unload the first item at the first container.

20 Claims, 10 Drawing Sheets

AUTOMATED PROBLEM SOLVE WORKFLOWS FOR SHUTTLE RAIL SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
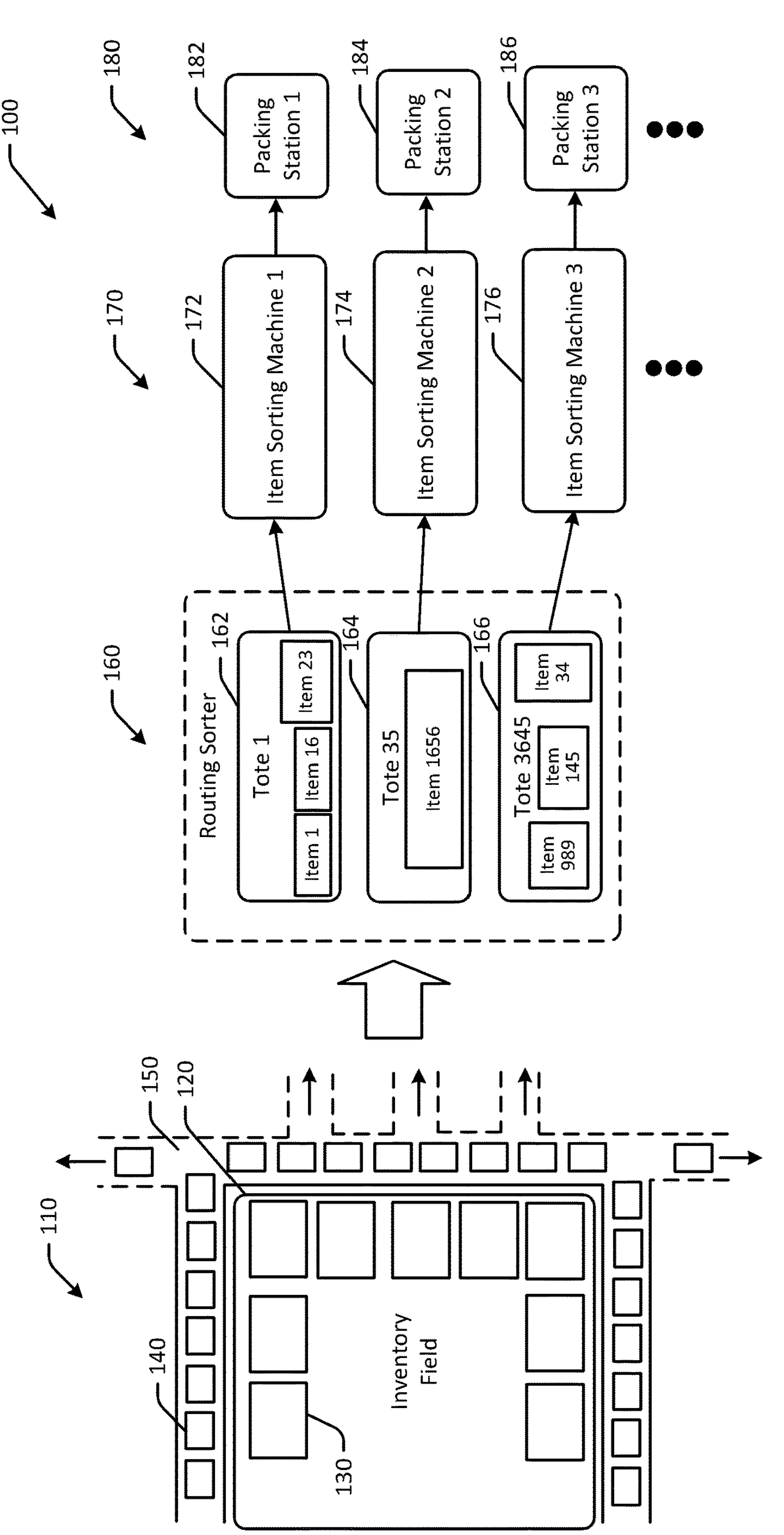
FIG. 1 is a hybrid schematic illustration of an example use case for shuttles powered by linear synchronous motors in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, in some facilities, a container of items may be loaded onto a shuttle, and the shuttle may transport the container from an inventory field to a sortation system or other location.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle. During movement, shuttles may experience loss of communication or other issues, for example due to power loss or radio interference, resulting in an inability for a system controller (such as that depicted in FIG. 9) to determine a shuttle identifier and/or tasks associated with a shuttle. For example, a shuttle may be tasked with delivering an item to a particular location, such as a chute in a sortation system. If the shuttle is no longer in communication with the controller, the shuttle may not be able to receive command data to determine its ongoing task, as discussed in more detail with respect to at least FIGS. 3A-5. Moreover, in some instances, shuttles may experience issues that prevent the shuttle from completing a task. For example, an item onboard the shuttle may be damaged and therefore undeliverable to its destination, or the shuttle may experience an onboard mechanical issue preventing the shuttle from ejecting the item.

Embodiments of the disclosure include automated recovery workflows and automated problem solve workflows that address at least these issues with shuttle rail systems. In some embodiments, automated recovery workflows allow for a shuttle to determine its last known task without having to deviate from its current course via use of a persistent shuttle identifier that is associated with the shuttles assigned task. As shuttles move through the shuttle rail system, shuttles may be assigned temporary identifiers for particular tasks the shuttle is to execute, and upon completion, the temporary identifier is replaced with another temporary identifier and associated with a new task. Certain embodiments detect the loss of communication with a shuttle and allow for a temporary shuttle identifier to be persistent, so as to allow recovery of the previously assigned task without manual intervention and/or deviation from an optimal shuttle route.

In some instances, shuttle rail systems as described herein may be used to automate the flow of items, which may be packages, from one point in a facility to another, such as from induction of an item to packing of the item in a package. Shuttles may be used to transport items and may move along rails. Computer systems or a controller of the shuttle rail system may have a controls layer and a software layer to track shuttle location and corresponding tasks assigned to individual shuttles. In the event tracking of a particular shuttle is lost on the controls layer, for any reason, typically a shuttle is routed to a physical recovery point at which hardware is used to determine a permanent shuttle identifier and the shuttle is re-recognized. However, this causes deviation from an optimal path and decreases system throughput as the shuttle is routed to particular locations of the physical recovery point. Once the shuttle is re-recognized, the software layer of the controller may send a new command to the shuttle to resume its previous task. In contrast, embodiments of the disclosure allow for in-flight or started, but not yet completed, tasks to be retrieved automatically by a shuttle and/or resent to a shuttle without having to route the shuttle to a physical recovery point via use of a persistent shuttle identifier that allows for the currently assigned task to be determined even in the event that communication between the controller and shuttle is temporarily disrupted.

In some embodiments, problem solve workflows for shuttles are automated. Typically, when an item cannot or is not delivered to an expected destination, whether because of an issue with the item or the shuttle itself, the shuttle is routed to a physical problem solve area where all problem solve shuttles are gathered for manual handling. Embodiments avoid this process by automating the problem solve workflow to allow shuttles to be automatically routed to a particular drop off point based on the particular issue being experienced with the shuttle and/or a particular issue with the item. As a result, manual intervention is limited to shuttle repairs, and the downstream process of handling damaged items is automated. Certain embodiments may automatically categorize and move items to the corresponding problem solve drop off location, such as a particular container. Some embodiments may also track problem solve containers at the problem solve stations and update statuses of the containers, shuttles and problem solve totes, based on the execution result of the problem solve commands sent to shuttles. Shuttles can then be routed downstream for new tasks to be assigned with minimal effect on system throughput.

Referring to FIG. 1, an example use case 100 for shuttles powered by linear synchronous motors in accordance with one or more embodiments of the disclosure. Although discussed in the context of online orders, other embodiments may be directed to any suitable use case where containers or items are transported, such as instances where objects are picked from inventory, placed into containers, containers or items are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The rails may be used with shuttles described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of items and/or containers by shuttles, or shuttle movement, occurs, systems as described herein with respect to automated recovery and automated problem solve workflows may be implemented.

Embodiments of the disclosure include systems and methods for automated shuttle recovery and problem solve workflows for shuttles powered by linear synchronous motors. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
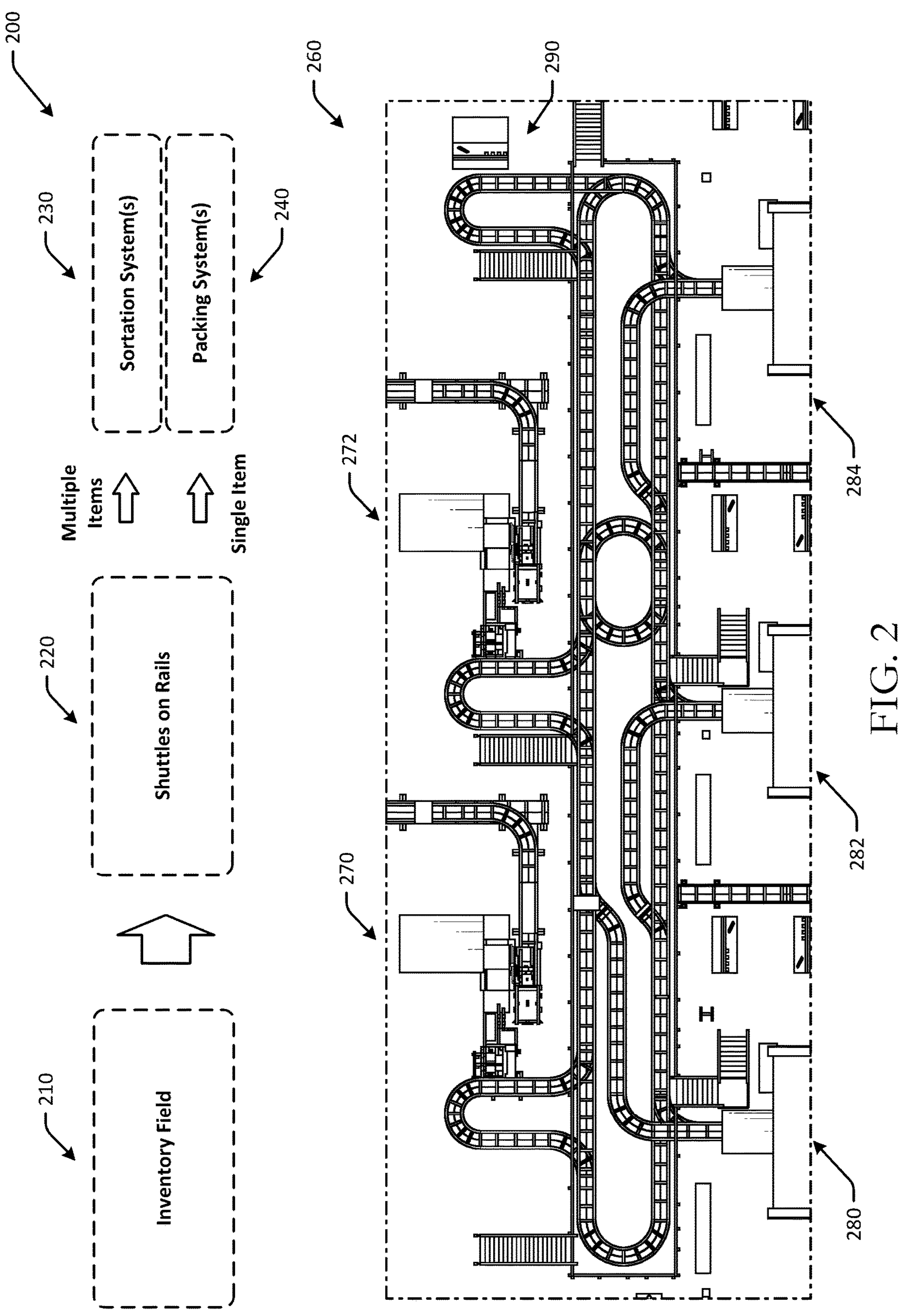
FIG. 2 is a schematic illustration of an example use case and facility layout for automated recovery and problem solve workflow systems for shuttles powered by linear synchronous motors in accordance with one or more embodiments of the disclosure.

FIG. 2 is a schematic illustration of an example use case 200 and facility layout for automated recovery and problem solve workflow systems for shuttles powered by linear synchronous motors in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using robots, vehicles, or a combination thereof.

The picked products may be placed into one or more containers and the items may be removed from the containers and inducted onto one or more shuttles for transport, such as one or more shuttles on rails 220. The shuttles on rails 220 may include shuttles that are configured to transport items without containers from one location to another via rails. The rails may include switching rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using switching rail components. The rail system 260 may include rails that link various systems, such as sortation systems, to each other and/or to other systems, such as container handling systems, manual induction systems 290, and so forth. For example, the rail system 260 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor surface, such as a belt, that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off the conveyor belt. The shuttles may include an onboard drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3A:
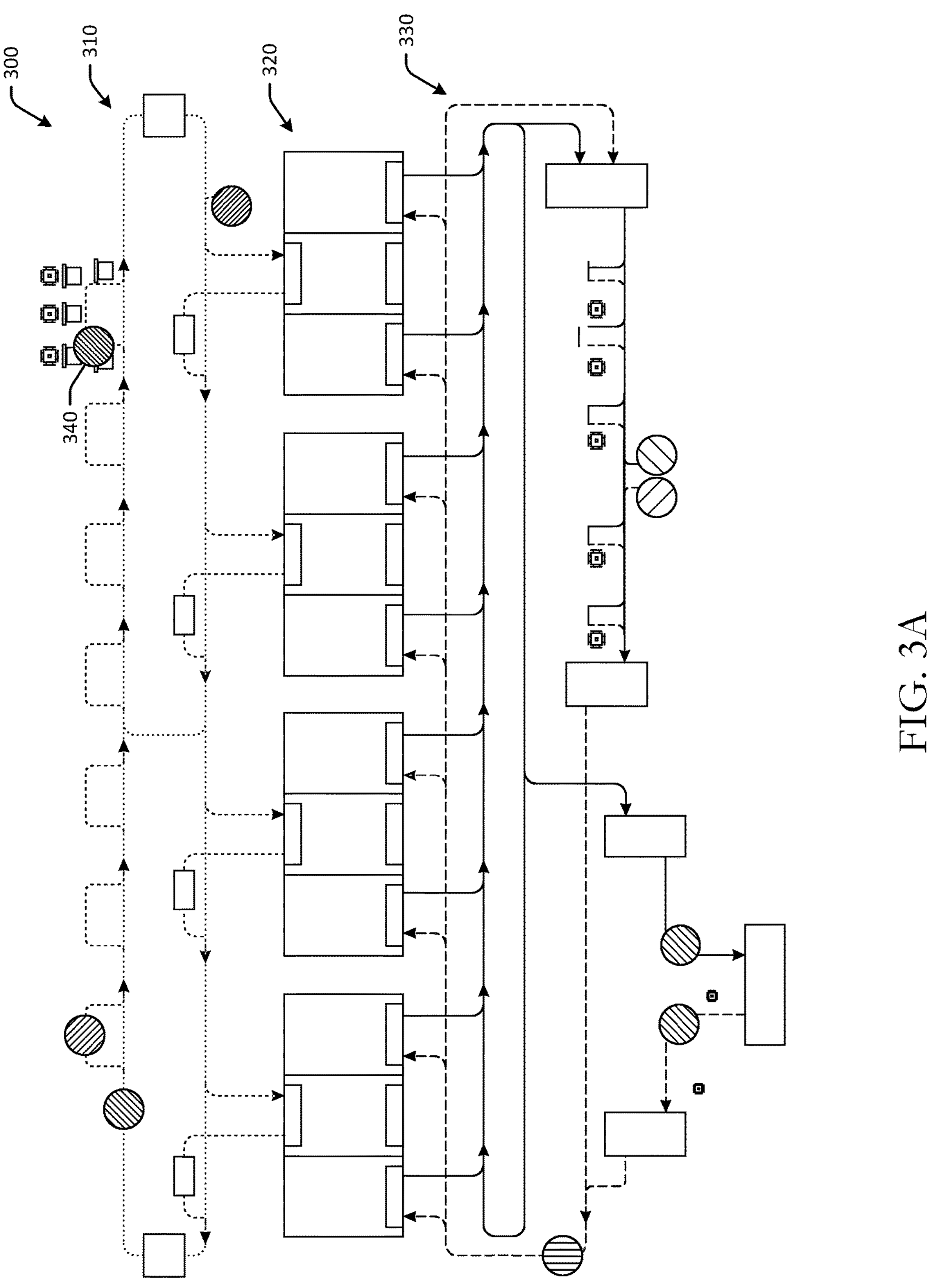
FIGS. 3A-3B are schematic illustrations of example shuttle rail system layouts in accordance with one or more embodiments of the disclosure.
Figure 3B:
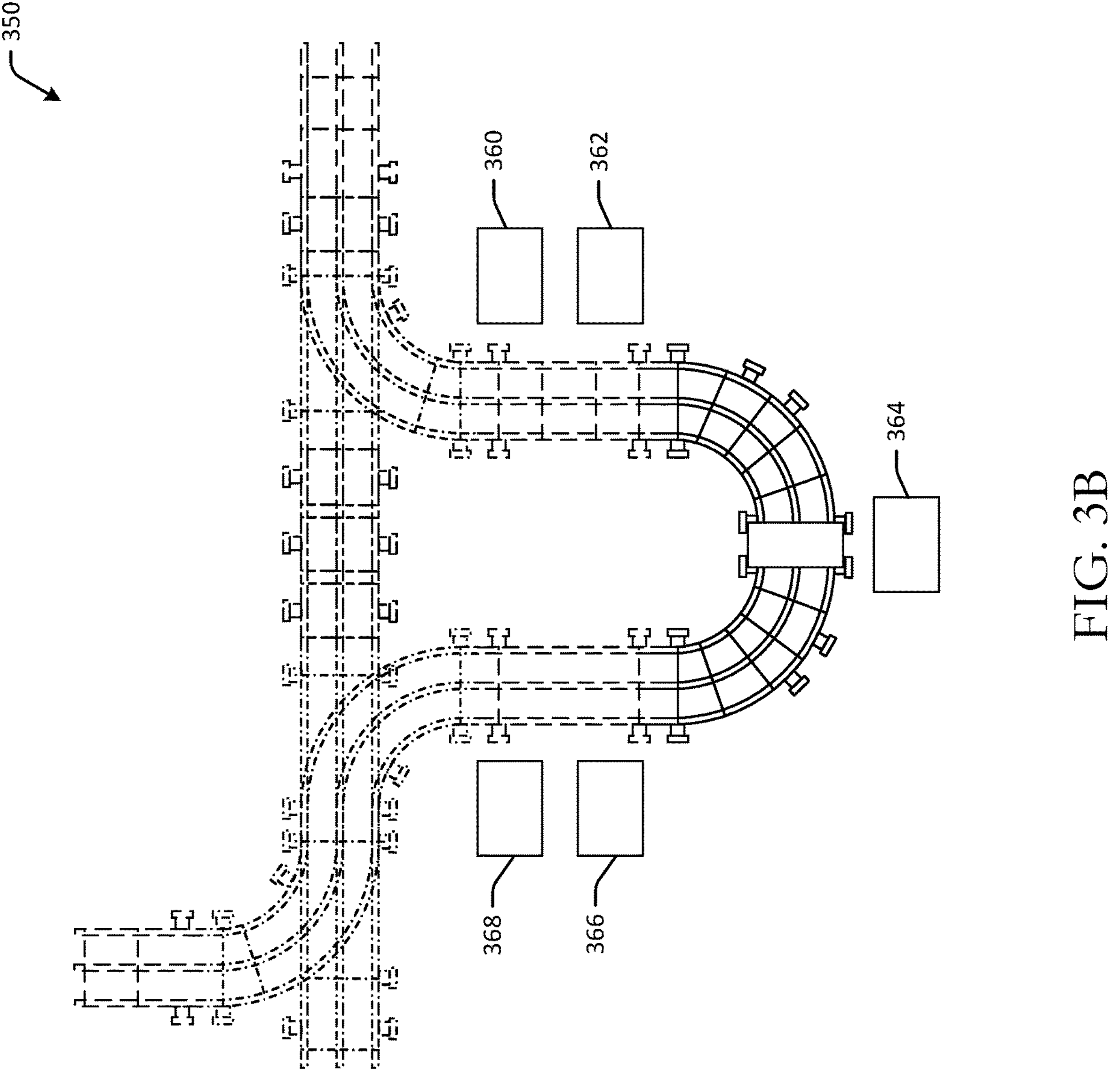

FIGS. 3A-3B are schematic illustrations of example shuttle rail system layouts in accordance with one or more embodiments of the disclosure. Other embodiments may include additional or fewer components. The illustrations of FIGS. 3A-3B are not to scale, and may not be illustrated to scale with respect to other figures. The system illustrated in FIGS. 3A-3B may be the same system discussed with respect to FIGS. 1A-2.

In FIG. 3A, a shuttle rail system 300 is depicted having a sample layout, where shuttles may induct items for sortation in section 310. One or more problem solve stations 340 may be dispersed at locations along the track, where the problem solve stations 340 may be locations shuttles can be routed to for drop off of items that were undeliverable and/or where maintenance can be performed on shuttles having mechanical or other issues.

Shuttles with inducted items onboard may be routed along a track to one or more sortation systems 320. In the sortation systems 320, the shuttles may deliver items to designated delivery points, such as a particular chute, container, or other location. Commands may be wirelessly communicated to shuttles via a system controller. As discussed herein, the shuttles may have permanent identifiers that may be static identifiers used to identify a particular shuttle. In some instances, permanent identifiers may be determined without physical contact, for example via a scanner, an RFID reader, or other hardware 342 that may be dispersed at various locations along the track. However, routing shuttles to the hardware 342 locations may be problematic in that the shuttle may have to deviate from a planned course and/or abort a task. This may create issues when communication with a shuttle is lost or interrupted, and is solved by the automated recovery of workflows described herein.

Aggregated items in the sortation systems 320 may be transported downstream to one or more packing stations 330 at which the items may be packed for shipment. For example, the sortation systems 320 may use containers to aggregate some or all of the items in a particular order for items. Once the items are aggregated, the items may be loaded onto a shuttle and transported downstream for packing.

In FIG. 3B, an example problem solve station 350 layout is depicted. At the problem solve station 350, one or more designated containers may be provided along the track for a shuttle to automatically deliver a problematic item to a particular container, so as to streamline processing instead of a single container for all problematic items and/or manual handling of shuttles arriving at the problem solve station. For example, a first container 360 may be designated for damaged items (e.g., as determined via manual or automated observation via cameras or other sensors, etc.), a second container 362 may be designated for items not delivered because of an issue with the destination (e.g., container full, etc.), a third container 364 may be designated for canceled items (e.g., items in an order that has been canceled, etc.), a fourth container 366 may be designated for undeliverable items due to a destination location not being found (e.g., barcode unreadable, error in delivery chute location identifier, etc.), a fifth container 368 may be designated for items undelivered due to an issue with the shuttle (e.g., shuttle door cannot open or close, conveyor inoperable, etc.), and so forth. Any number of containers may be used with any number of different designations, including designations different than the examples provided herein.

Figure 4:
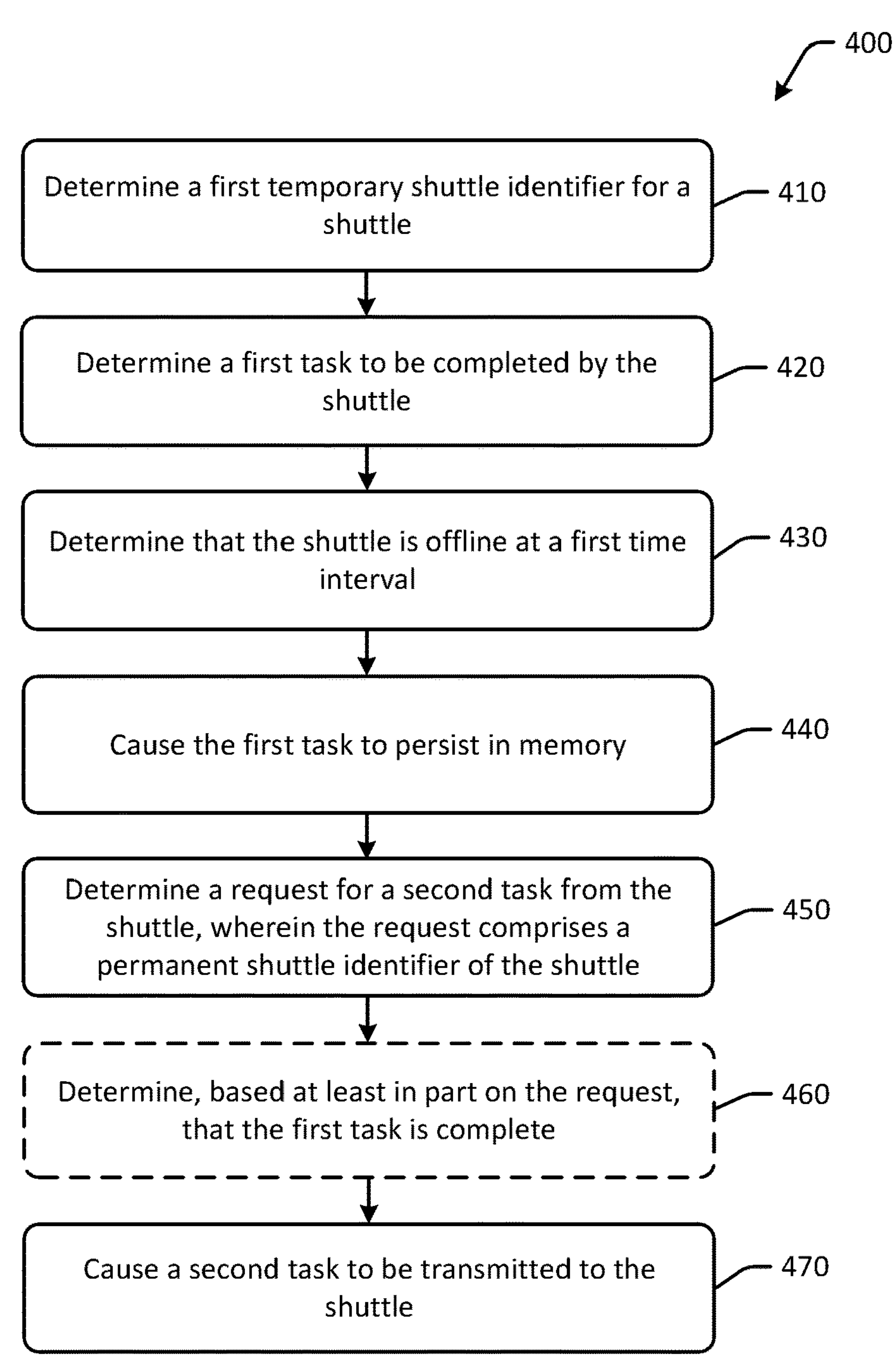
FIG. 4 is an example process flow for automated recovery of shuttle workflows in accordance with one or more embodiments of the disclosure.

FIG. 4 depicts an example process flow 400 for automated recovery of shuttle workflows in accordance with one or more embodiments of the disclosure. While example embodiments of the disclosure may be described in the context of linear synchronous shuttles, it should be appreciated that the disclosure is more broadly applicable to any type of shuttle rail systems. Some or all of the blocks of the process flows in this disclosure may be performed in a distributed manner across any number of devices. The operations of the process flow 400 may be optional and may be performed in a different order.

The process flow 400 may be executed by a controller having one or more computer processors and may be performed in conjunction with a shuttle rail system where the controller is in communication with one or more shuttles. In some embodiments, the shuttle rail system may include a track along which the shuttles are propelled via one or more electromagnets. The process flow 400 may be used to automatically recover a shuttle workflow in the event communication is lost or disrupted between a particular shuttle and a shuttle rail system controller.

At block 410 of the process flow 400, computer-executable instructions stored on a memory of a device, such as a remote server or a controller, may be executed to determine a first temporary shuttle identifier for a shuttle. For example, one or more shuttle tracking modules may determine a first temporary shuttle identifier for a shuttle. Temporary shuttle identifiers may be assigned to a shuttle in conjunction with a task, and may be updated once a shuttle completes a task. For example, a temporary shuttle identifier may be assigned when a shuttle is at an induct station and may be associated with the item(s) inducted on the shuttle. Once the shuttle completes the assigned task, the shuttle may return to an induct queue or other location, after which the temporary shuttle identifier may be replaced with another temporary shuttle identifier. In some instances, shuttles may be configured to receive command data from a computer system or controller associated with the shuttle rail system. The shuttles may be configured to move along a track to complete tasks. In some embodiments, the shuttle may store the first temporary shuttle identifier locally, such as in onboard memory.

At block 420 of the process flow 400, computer-executable instructions stored on a memory of a device, such as a remote server or a controller, may be executed to determine a first task to be completed by the shuttle. For example, one or more control modules may determine a first task to be completed by the shuttle. In some embodiments, the first task may be the currently assigned task the shuttle is to complete. Such tasks may include delivery of a particular item, induction of a particular item, instructions to move to a particular queue along a shuttle track, instructions to go to a maintenance area, and so forth. The temporary shuttle identifier may be associated with the first task in memory at the shuttle rail system controller. In one particular example, the first temporary shuttle identifier is associated with the first task in a particular layer of software.

At block 430 of the process flow 400, computer-executable instructions stored on a memory of a device, such as a remote server or a controller, may be executed to determine that the shuttle is offline at a first time interval. For example, one or more shuttle tracking modules may determine that the shuttle is offline at a first time interval. The controller may have lost communication with the shuttle due to power loss, radio interference, power resets, track resets, and/or other reasons. The controller may therefore determine that the shuttle is offline or that communication with the shuttle has been disrupted. The communication link may have been disrupted while the shuttle was in-flight or was in the process of completing a task (e.g., or had a task assigned to the shuttle, etc.). In some embodiments, the controller may determine that the shuttle is offline as a result of determining that a location of the shuttle is no longer known. For example, the controller may determine that a location of the shuttle is unknown before or after determining that the shuttle is offline. For shuttles that are offline temporarily or for which communication is briefly disrupted, the controller may be able to recover the communication link and corresponding shuttle identifier and location. For other situations, the controller may determine that the shuttle location is no longer known regardless of whether a communication link is reestablished. In some embodiments, the controller may determine that the shuttle is an in-flight shuttle after determining that the shuttle is offline. In-flight shuttles may be shuttles having a currently assigned task, shuttles with items onboard, shuttles moving along a track or otherwise not in a queue, and so forth. For shuttles that are not in-flight, the controller may cause the shuttle to be routed to a hardware station for re-recognition or re-identification of the permanent shuttle identifier.

At block 440 of the process flow 400, computer-executable instructions stored on a memory of a device, such as a remote server or a controller, may be executed to cause the first task to persist in memory. For example, one or more control modules may cause the first task to persist in memory. After determining that the shuttle is offline, the system controller may determine that the shuttle may still complete the previously assigned task without communication with the system controller, and may therefore cause the first temporary shuttle identifier and the first task to persist in memory instead of being reset when communication is lost or the shuttle is offline. This may allow for the shuttle to continue with the previously assigned task by allowing recovery of the previously assigned task from memory instead of having to re-recognize the shuttle via its permanent identifier at a hardware station. The shuttle may access the previously assigned task without the system controller knowing the shuttle identifier since the first temporary shuttle identifier and the first task are persisting in memory. The shuttle may therefore continue to complete the task although the system controller is unaware of the shuttle identifier and/or location. In some instances, both the first temporary shuttle identifier and the first task may be caused to persist in memory.

At block 450 of the process flow 400, computer-executable instructions stored on a memory of a device, such as a remote server or a controller, may be executed to determine a request for a second task from the shuttle, where the request comprises a permanent shuttle identifier of the shuttle. For example, one or more control modules may determine a request for a second task from the shuttle, where the request comprises a permanent shuttle identifier of the shuttle. In one example, the controller may receive a request from the shuttle or another computer system requesting a second task for the shuttle that was offline or with which communication was lost. The request may include the permanent shuttle identifier that is stored locally onboard the shuttle, and may not have been determined directly by the controller via a hardware station or physical readout. In some instances, the controller may determine an updated location of the shuttle based at least in part on the request for the second task. For example, the request may be received from a particular location along the track and/or may have a positional identifier included with or in addition to the request.

In some embodiments, the request for the second task may be at an induct station or empty shuttle queue location, and the controller may therefore determine that the shuttle has completed the previously assigned task, even though the communication link was interrupted.

At optional block 460 of the process flow 400, computer-executable instructions stored on a memory of a device, such as a remote server or a controller, may be executed to determine, based at least in part on the request, that the first task is complete. For example, one or more control modules may determine, based at least in part on the request, that the first task is complete. For example, by causing the first temporary shuttle identifier and the first task to persist in memory, the shuttle may access the previously assigned task and complete the task without the system controller knowing the shuttle identifier or location. As a result, the system controller may infer that the previously assigned task has been successfully completed. For example, after determining the request for the second task, the controller may determine, using the permanent shuttle identifier and the first task, and may determine that the first task is completed.

In some embodiments, the system controller may determine a first location associated with the first task, and may determine a second location associated with a sensor station at which the request for the second task was received. The controller may determine that the second location is downstream along a track relative to the first location. The controller may therefore determine, based at least in part on the request, that the first task is complete.

In another example, the controller may determine a first location associated with the first task, determine a second location associated with a sensor station at which the request for the second task was received, and may determine that the second location is upstream along a track relative to the first location. In such instances, the second task may be the same as the first task.

At block 470 of the process flow 400, computer-executable instructions stored on a memory of a device, such as a remote server or a controller, may be executed to cause a second task to be transmitted to the shuttle. For example, one or more control modules may cause a second task to be transmitted to the shuttle. The second task may be a new task if the first task was completed, and/or may be the same as the first task in the event the first task was not yet completed. In some embodiments, the controller may cause the first temporary shuttle identifier and the first task to be cleared from memory after determining that the first task is complete. The controller may cause a second temporary shuttle identifier to be associated with the shuttle. The second temporary shuttle identifier may optionally be associated with a subsequent task.

Figure 5:
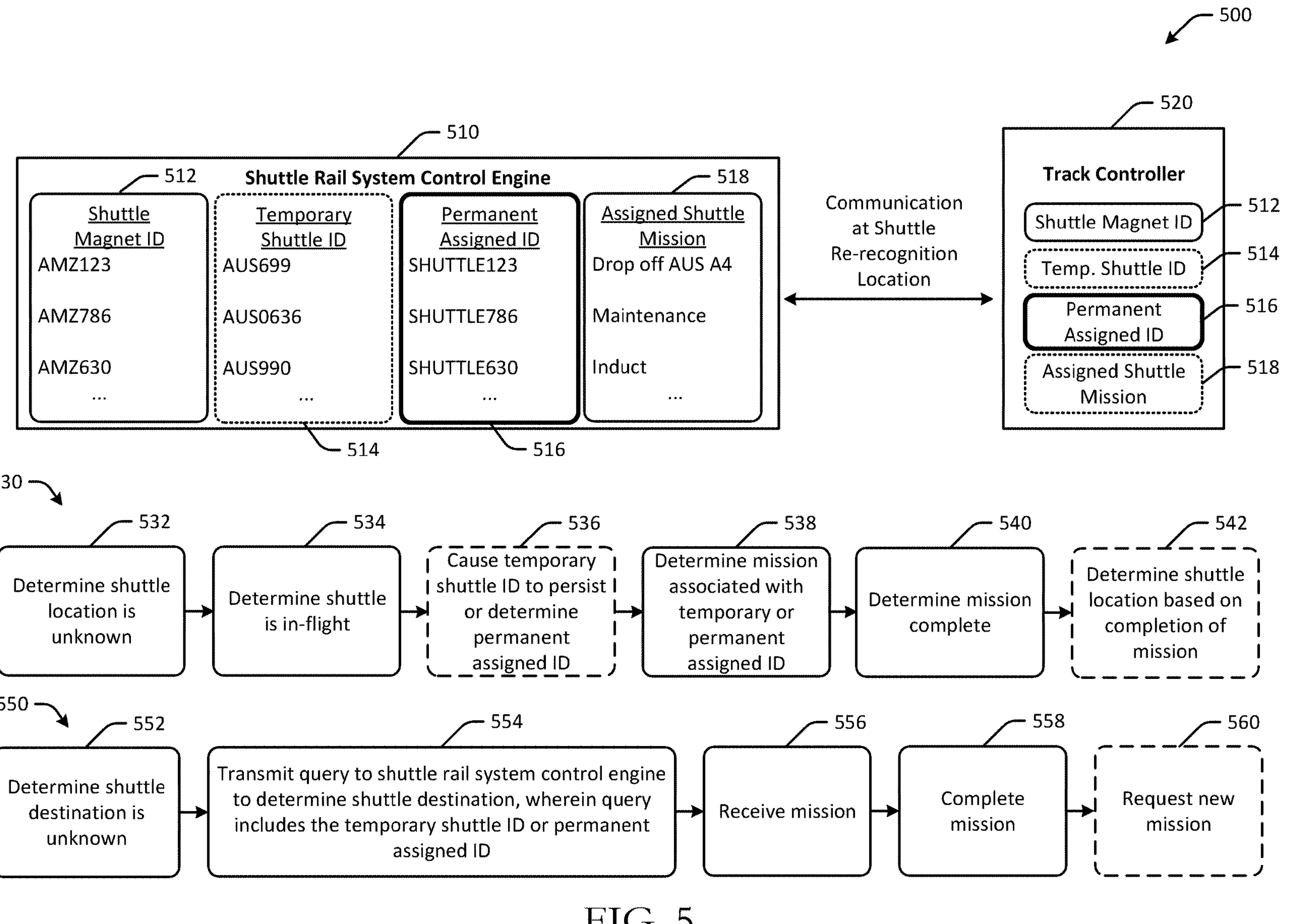
FIG. 5 schematically illustrates an example communication flow and sample process flows for automated recovery of shuttle workflows in accordance with one or more example embodiments of the disclosure.

FIG. 5 schematically illustrates an example communication flow 500 and sample process flows for automated recovery of shuttle workflows in accordance with one or more example embodiments of the disclosure. Different embodiments may include different, additional, or fewer inputs or outputs than those illustrated in the examples of FIG. 5.

In FIG. 5, an example communication flow 500 is schematically depicted. A shuttle rail system control engine or system controller 510 may be in communication with an onboard track controller 520. The system controller 510 may communicate commands and/or other data to the track controller 520, and the track controller 520 may communicate various data to the system controller 510. For example, the system controller 510 may send the track controller 520 task information, temporary shuttle identifier information, destination or drop off location information, and so forth.

The track controller 520 may have access to and/or locally store various system information. For example, the track controller 520 may include data related to shuttle magnet identifiers 512, where the magnet identifiers may be permanent shuttle identifiers. For example, the magnet identifiers may be RFID-based identifiers associated with the magnet coupled to the shuttle, where the magnet identifier may be static and used for re-recognition of lost shuttles. Additional information may include data related to temporary shuttle identifiers 514, data related to permanent assigned identifiers 516 (which may be the same or different from the corresponding shuttle magnet identifiers 512), data related to assigned tasks or missions 518 for particular shuttles, and so forth. Other or different data may be included.

The track controller 520 may have various information stored locally or otherwise accessible to the shuttle. For example, the track controller 520 may have is shuttle magnet identifier 512, its temporary shuttle identifier 514, the permanent assigned identifier 516, the assigned shuttle mission 518, and so forth.

In the event of a communication loss for a particular shuttle, the system controller 530 may execute a process flow 530. At block 532, the system controller 510 may determine that the shuttle location is unknown for a particular shuttle. At block 534, the system controller 510 may determine that the shuttle is in-flight. For example, the shuttle may be in the process of completing a task. At optional block 536, the system controller 510 may cause the temporary shuttle identifier for the shuttle to persist and/or may determine the permanent assigned shuttle identifier. At block 538, the system controller 510 may determine a mission or task associated with the temporary or permanent assigned shuttle identifier. At block 540, the system controller 510 may determine that the mission or task is complete. At optional block 542, the system controller 510 may determine the shuttle location based at least in part on the completion of the mission.

At various points along the track, the system controller 510 and the track controller 520 may exchange data, such as the illustrated communication at a shuttle re-recognition location. The permanent assigned identifier, previously assigned task, temporary shuttle identifier, and so forth may be communicated to and/or from the track controller 520.

In the event of a communication loss for a particular shuttle, the track controller 520 and/or its onboard controller may execute a process flow 550. At block 552, the track controller 520 may determine that its shuttle location destination is unknown. At block 554, the track controller 520 may transmit a query to the shuttle rail system control engine or system controller 510 to determine the shuttle destination, where the query may include the temporary shuttle identifier and/or the permanent shuttle identifier. At block 556, the track controller 520 may receive the mission or task data. At block 558, the track controller 520 may complete the mission or task, even though the shuttle is not recognized by the system controller 510. At optional block 560, the track controller 520 may determine that the mission or task is complete and request a new task or mission, after which a new temporary shuttle identifier may be assigned.

Figure 6:
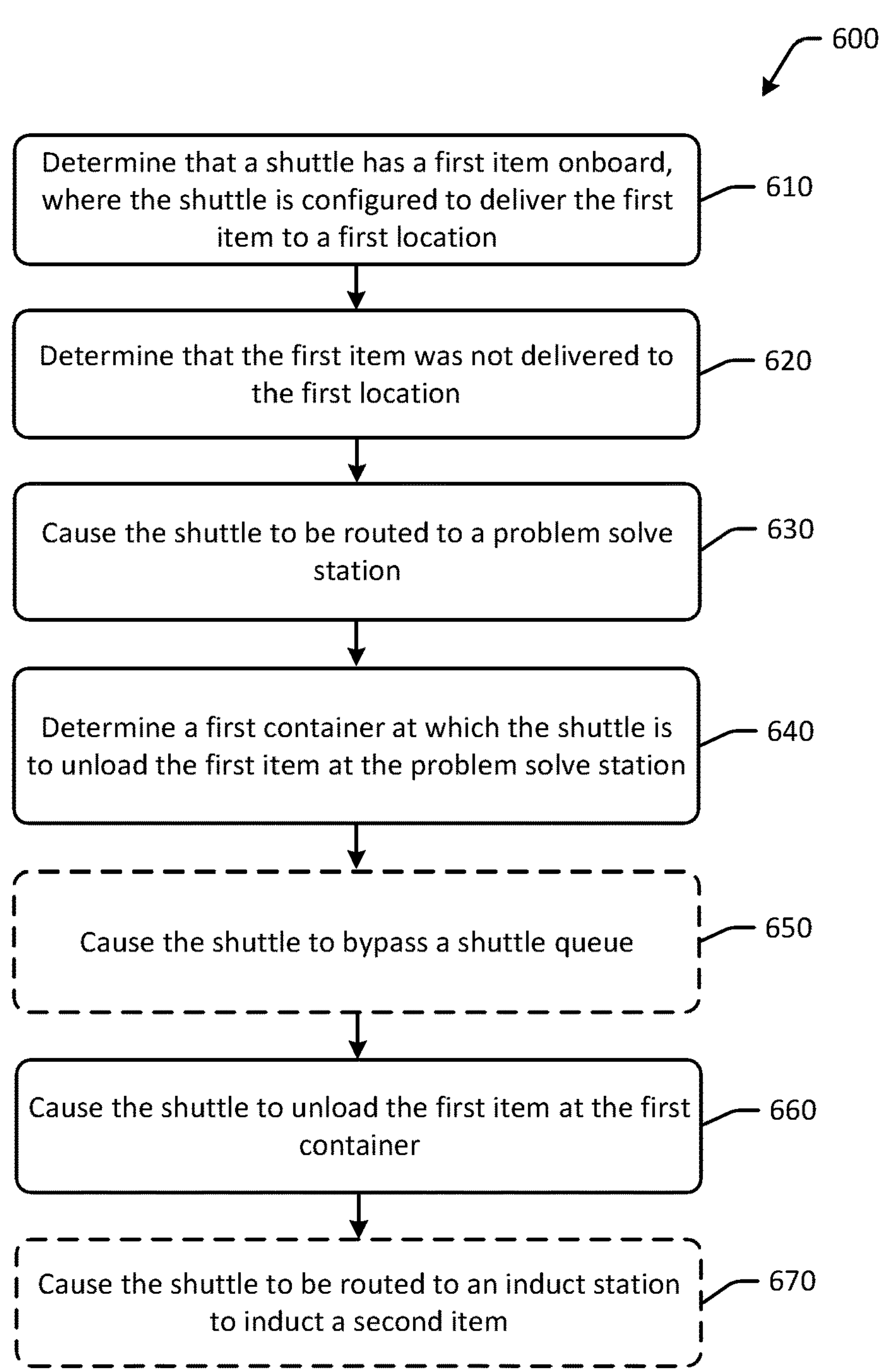
FIG. 6 is an example process flow for automated problem solve workflows for shuttles in accordance with one or more embodiments of the disclosure.

FIG. 6 depicts an example process flow 600 for automated problem solve workflows for shuttles in accordance with one or more embodiments of the disclosure. While example embodiments of the disclosure may be described in the context of linear synchronous shuttles, it should be appreciated that the disclosure is more broadly applicable to any type of shuttle rail systems. Some or all of the blocks of the process flows in this disclosure may be performed in a distributed manner across any number of devices. The operations of the process flow 600 may be optional and may be performed in a different order.

The process flow 600 may be executed by a controller having one or more computer processors and may be performed in conjunction with a shuttle rail system where the controller is in communication with one or more shuttles. In some embodiments, the shuttle rail system may include a track along which the shuttles are propelled via one or more electromagnets. The process flow 600 may be used to automatically problem solve shuttle workflows via a shuttle rail system controller. In some embodiments, a shuttle rail system can include a container matrix or sortation system, a track, a shuttle configured to deliver items to locations in the container matrix via the track, and a system controller.

In particular, problem solve workflows may specifically addresses problems detected with inventory management. There are a large number of detailed scenarios that could result in a failure to sort an item, including equipment failures that will prevent automated handling of the problem, but for cases where the shuttle is functional and there is a clear path to move it to the problem solve station, certain embodiments automate the problem solve process.

At block 610 of the process flow 600, computer-executable instructions stored on a memory of a device, such as a remote server or a controller, may be executed to determine that a shuttle has a first item onboard, where the shuttle is configured to deliver the first item to a first location. For example, one or more shuttle tracking modules may that a shuttle has a first item onboard, where the shuttle is configured to deliver the first item to a first location. The shuttle may be determined to have the first item onboard based at least in part on a task status associated with the shuttle, a position of a shuttle along a track (e.g., downstream from an induct station, upstream from a sortation system, etc.), and so forth. The shuttle may be determined to be in-flight with the particular status of an item onboard.

At block 620 of the process flow 600, computer-executable instructions stored on a memory of a device, such as a remote server or a controller, may be executed to determine that the first item was not delivered to the first location. For example, one or more control modules may determine that the first item was not delivered to the first location. The first item may not have been delivered for a number of reasons, such as damage to the item, cancelation of an order, a problem with the shuttle, a problem with the destination, and so forth.

At block 630 of the process flow 600, computer-executable instructions stored on a memory of a device, such as a remote server or a controller, may be executed to cause the shuttle to be routed to a problem solve station. For example, one or more shuttle tracking modules may cause the shuttle to be routed to a problem solve station. The controller may send command instructions to the shuttle to cause the shuttle to return to a problem solve station downstream from the shuttle or upstream from the shuttle with the first item.

At block 640 of the process flow 600, computer-executable instructions stored on a memory of a device, such as a remote server or a controller, may be executed to determine a first container at which the shuttle is to unload the first item at the problem solve station. For example, one or more control modules may determine a first container at which the shuttle is to unload the first item at the problem solve station. As discussed at least with respect to FIGS. 3A-3B, there may be dedicated containers at the problem solve station for different types of issues. The system controller may cause the shuttle to deliver the item to a particular container based at least in part on the reason for failure of the delivery.

In one example, the controller may determine the first container at which the shuttle is to unload the first item by selecting the first container from a set of containers, where the set of containers has the first container that is associated with a first item problem category, and a second container associated with a second item problem category.

At optional block 650 of the process flow 600, computer-executable instructions stored on a memory of a device, such as a remote server or a controller, may be executed to cause the shuttle to bypass a shuttle queue. For example, one or more control modules may cause the shuttle to bypass a shuttle queue. A shuttle queue may be formed at various points along the track, such as an empty shuttle queue awaiting task assignment, an induct queue awaiting item induction, and so forth. Shuttles routed to a problem solve station may be configured to bypass queues to expeditiously arrive at the problem solve queue and return to subsequent task fulfilment. Bypass may prioritize movement of shuttles routed to problem solve stations over other shuttles by causing certain shuttles to clear a path, move onto a branched path, move forward in a queue to create space for the problem solve shuttle, and so forth.

At block 660 of the process flow 600, computer-executable instructions stored on a memory of a device, such as a remote server or a controller, may be executed to cause the shuttle to unload the first item at the first container. For example, one or more control modules may cause the shuttle to unload the first item at the first container. The shuttle may therefore unload the first item in the container designated for related problems. The first item may be handled in an automated manner thereafter.

At optional block 670 of the process flow 600, computer-executable instructions stored on a memory of a device, such as a remote server or a controller, may be executed to cause the shuttle to be routed to an induct station to induct a second item. For example, one or more control modules may cause the shuttle to be routed to an induct station to induct a second item. The shuttle may return to service and induct a second item for transportation after the first item is dropped off at the problem solve station. For issues with the shuttle, the shuttle may remain at the problem solve station at a maintenance area for maintenance to be performed prior to returning to service.

In one example, the system controller may determine a first location in the container matrix for a first item to be delivered by the shuttle, and may determine that the shuttle is moving to the first location. The controller may determine that the first item was not delivered at the first location, and may cause the shuttle to be automatically routed to a problem solve station via the track. The controller may determine, using metadata associated with the first item, that the first item is to be delivered to a first container at the problem solve station, cause the shuttle to unload the first item at the first container, and may cause the shuttle to be routed to an induct station to induct a second item. The controller may determine that the second item was not delivered, and may determine that the shuttle has a mechanical issue preventing unloading of the second item. The controller may cause the shuttle to be automatically routed to a maintenance area via the track.

Figure 7:
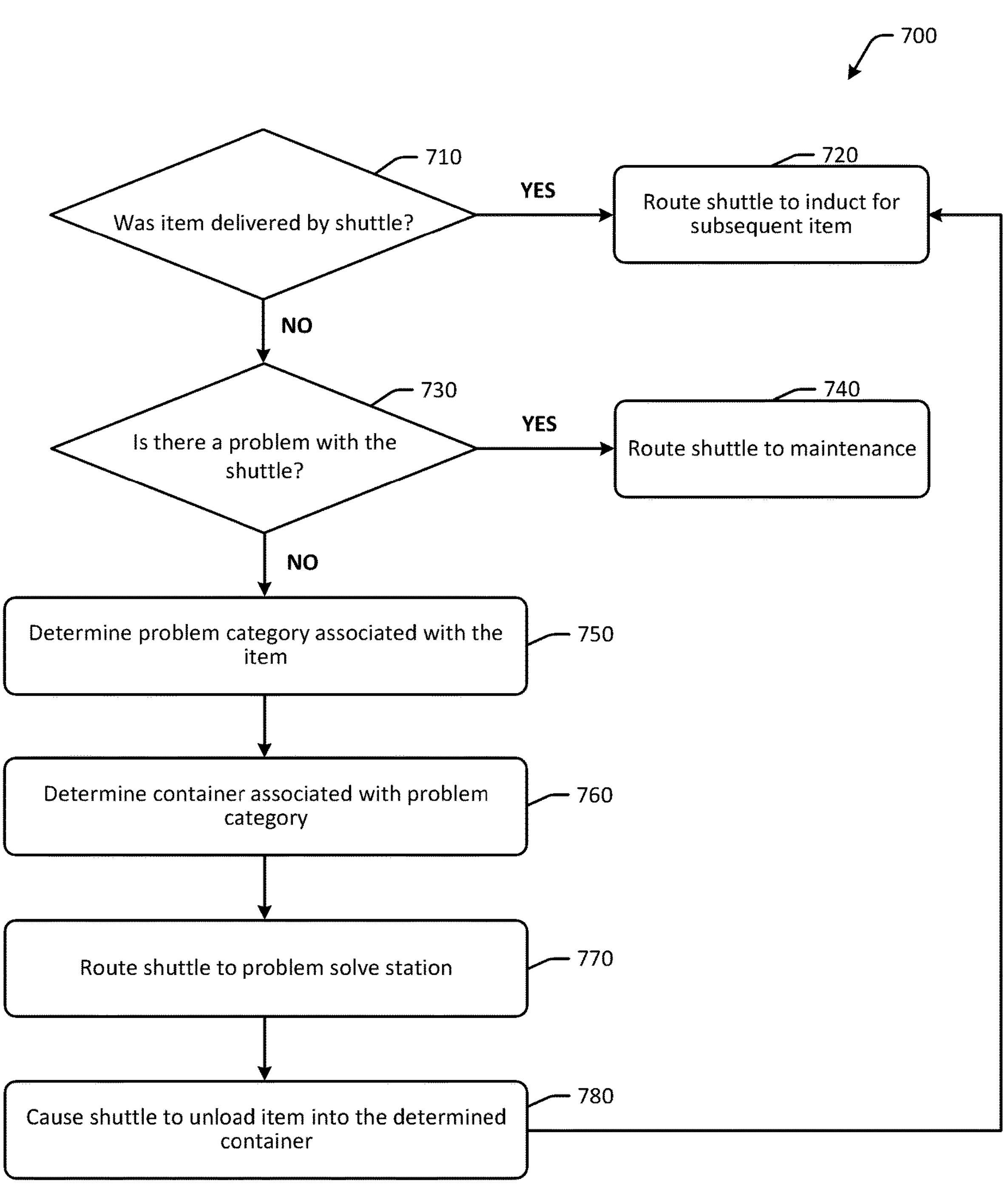
FIG. 7 is an example process flow for automated problem solve workflows for shuttles in accordance with one or more embodiments of the disclosure.

FIG. 7 depicts an example process flow 700 for automated problem solve workflows for shuttles in accordance with one or more embodiments of the disclosure. While example embodiments of the disclosure may be described in the context of linear synchronous shuttles, it should be appreciated that the disclosure is more broadly applicable to any type of shuttle rail systems. Some or all of the blocks of the process flows in this disclosure may be performed in a distributed manner across any number of devices. The operations of the process flow 400 may be optional and may be performed in a different order.

At determination block 710, a determination may be made as to whether an item was delivered by a shuttle. For example, a system controller for a shuttle rail system may determine whether a particular item was delivered by a shuttle. If the determination at determination block 710 is positive in that the item was delivered, the process flow 700 may proceed to block 720, at which the shuttle may be routed to induct for induction of a subsequent item. If it is determined at determination block 710 that the item was not delivered, the process flow 700 may proceed to determination block 730.

At determination block 730, a determination may be made as to whether there is a problem with the shuttle. For example, a system controller for a shuttle rail system may determine that the item was not delivered due to an issue with the shuttle itself (as opposed to the item or destination, etc.). In some embodiments, the shuttle is configured to receive command data from the controller, and to move along a track to deliver items. The shuttle may be further configured to detect an onboard issue with the shuttle locally.

If the determination at determination block 730 is positive in that the item was delivered, the process flow 700 may proceed to block 740, at which the shuttle may be routed to a maintenance bay for maintenance. If it is determined at determination block 730 that there is not a problem with the shuttle, the process flow 700 may proceed to block 750.

At block 750, the system controller may determine a problem category associated with the item, such as those discussed with respect to FIGS. 3A-3B. For example, the system controller may determine metadata associated with the first item, determine, using the metadata, that the first item is not to be delivered, and may cause the shuttle to cancel delivery of the first item to the first location. The metadata can include data associated with a manual input when the first item is loaded on the shuttle. In one example, the metadata includes data associated with an operator input when the first item is loaded on the shuttle, such as a notification of item damage.

At block 760, the system controller may determine a container associated with the problem category. At block 770, the system controller may cause the shuttle to be routed to a problem solve station. At block 780, the system controller may cause the shuttle to unload the item into the determined container. The process flow 700 may then proceed to block 720, at which the shuttle may be routed to induct for induction of a subsequent item.

In one example of a shuttle maintenance issue, the system controller may determine that the shuttle has an item onboard, determine that the second item was not delivered, and may determine that the shuttle has a mechanical issue. The system controller may cause the shuttle to be routed to a maintenance area via the track. The system controller may optionally cause the shuttle to bypass a shuttle queue enroute to the maintenance area. In a particular bypass path, the system controller may determine that the shuttle is downstream from an item induct location, and may determine a route to the problem solve station that passes through a container matrix. For items having critical pick times or urgent for delivery, the system controller may determine that the first item is associated with a high priority delivery notification, and cause the shuttle to bypass a shuttle queue enroute to the problem solve station.

Figure 8:
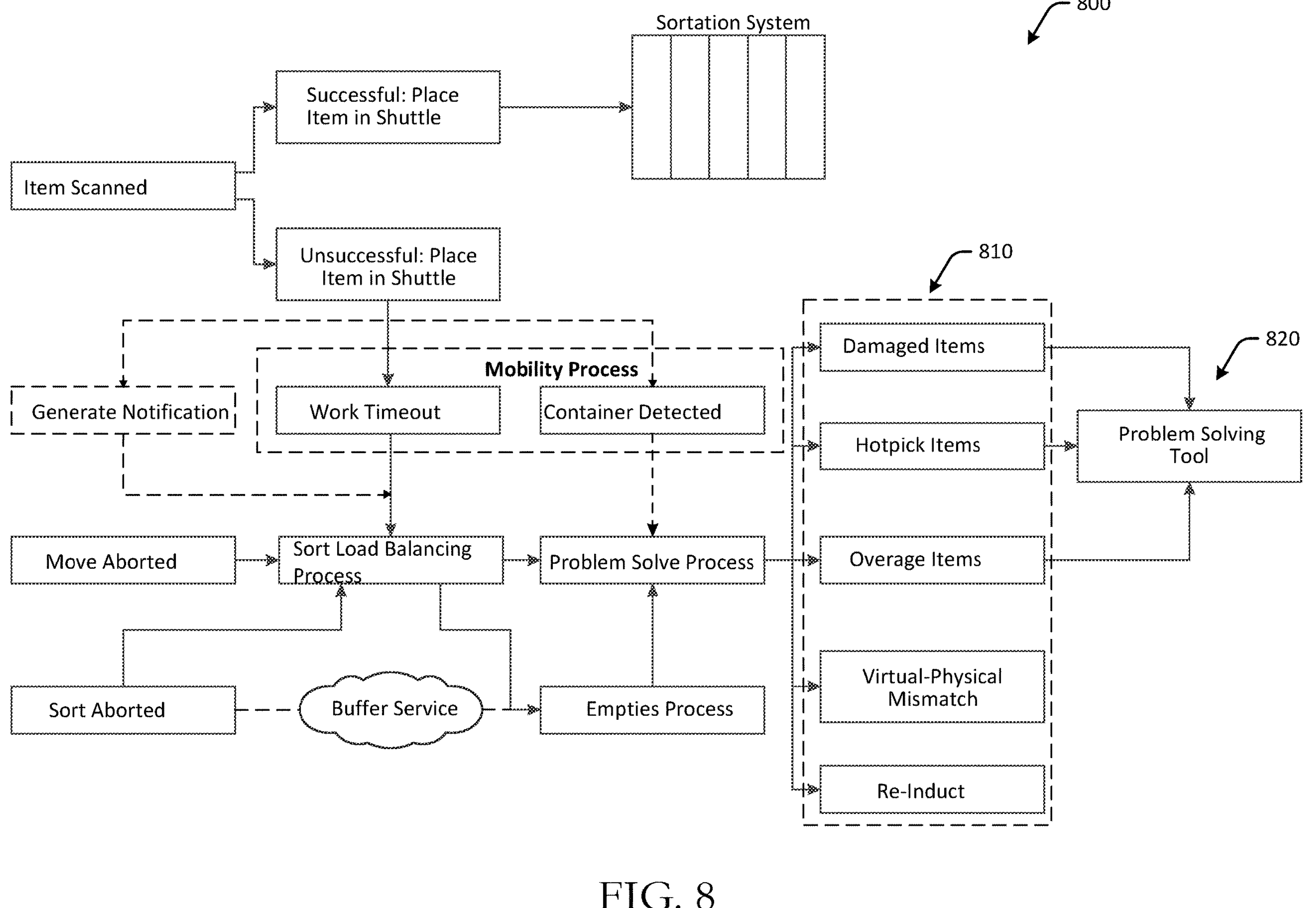
FIG. 8 schematically illustrates an example workflow path for automated problem solve workflows in accordance with one or more example embodiments of the disclosure.

FIG. 8 schematically illustrates an example workflow path 800 for automated problem solve workflows in accordance with one or more example embodiments of the disclosure. While example embodiments of the disclosure may be described in the context of linear synchronous shuttles, it should be appreciated that the disclosure is more broadly applicable to any type of shuttle rail systems. Some or all of the blocks of the workflows in this disclosure may be performed in a distributed manner across any number of devices. The operations of the workflow path may be optional and may be performed in a different order.

An item may be scanned, and if successfully scanned, the item may be placed on a shuttle and sent downstream for sortation to a sortation system. If the scan is unsuccessful, the item may be placed in the shuttle and a problem solve workflow may be kicked off by generation of a notification. A mobility process having a work timeout and container detected process may be implemented. The mobility process may cause automatic recirculation laps on the track system until directed to a particular sortation system for sorting.

Additional processes, including aborting a planned path of movement or kicking off a sort load balancing process may be performed prior to the problem solve process. When something changes with regard to an order (e.g., canceled by the customer, problem detected with part of the order, etc.) and the work requests are canceled at the sort load balancing process segment level, any in-flight items which have not been fully sorted are sent to the problem solve workflow process.

The problem solve process may include one or more containers 810 having different designations to receive items of particular categories, such as damaged items, hot pick or urgent items, overage items or overflowing containers, virtual physical mismatch items or items that do not match the virtual description, re-induct items for a variety of reasons, and so forth. A problem solving tool 820 may be used to automate processing of the items deposited in problem solve containers and/or used by manual operators to resolve issues with the items.

One or more operations of the methods, process flows, or use cases of FIGS. 1-8 may have been described above as being performed by a controller, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
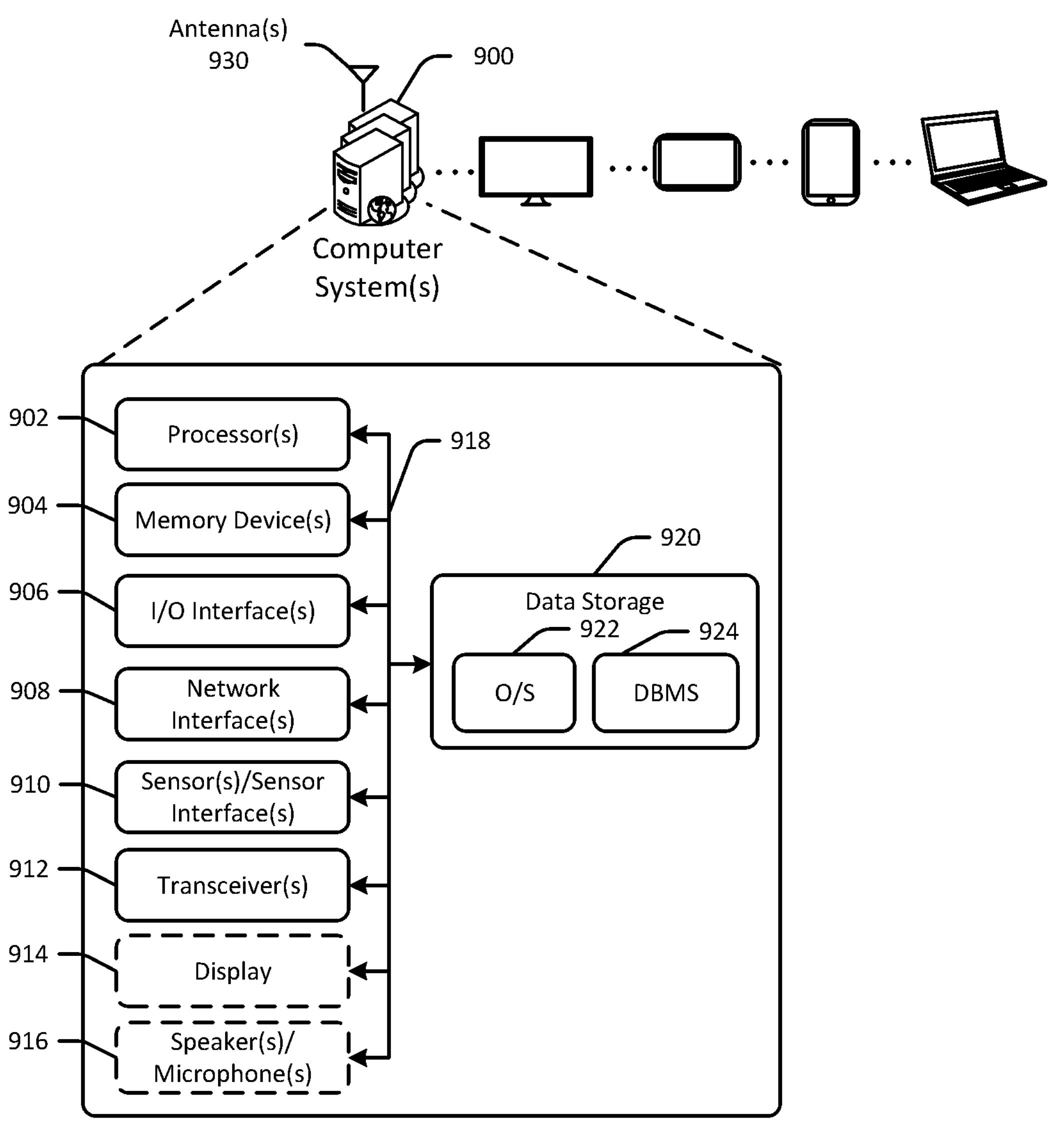
FIG. 9 schematically illustrates an example architecture of a computer system associated with a shuttle rail system in accordance with one or more embodiments of the disclosure.

FIG. 9 is a schematic block diagram of one or more illustrative computer system(s) 900 associated with a shuttle rail system in accordance with one or more embodiments of the disclosure. The computer system(s) 900 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 900 may correspond to an illustrative device configuration for the controller(s) of FIGS. 1-8. For example, the computer system(s) 900 may be a controller and may independently control one or more aspects of the shuttle wheel wear monitoring systems described in FIGS. 1-8.

The computer system(s) 900 may be configured to communicate with one or more servers, user devices, or the like. The computer system(s) 900 may be configured to cause images to be captured, determination shuttle wheel wear status, identify shuttles, and so forth.

The computer system(s) 900 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 900 may include one or more processors (processor(s)) 902, one or more memory devices 904 (also referred to herein as memory 904), one or more input/output (I/O) interface(s) 906, one or more network interface(s) 908, one or more sensor(s) or sensor interface(s) 910, one or more transceiver (s) 912, one or more optional display(s) 914, one or more optional microphone(s) 916, and data storage 920. The computer system(s) 900 may further include one or more bus(es) 918 that functionally couple various components of the computer system(s) 900. The computer system(s) 900 may further include one or more antenna(s) 930 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit the exchange of information (e.g., data (including computer-executable code), signaling, etc.) between various components of the computer system(s) 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 904 of the computer system(s) 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to the memory 904 for use by the processor(s) 902 during the execution of the computer-executable instructions. Moreover, output data generated as a result of execution of the computer-executable instructions by the processor(s) 902 may be stored initially in the memory 904, and may ultimately be copied to the data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like. Some or all of these module(s) may be sub-module(s). Any of the components depicted as being stored in the data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in the data storage 920 may support functionality described in reference to corresponding components named earlier in this disclosure.

The data storage 920 may further store various types of data utilized by the components of the computer system(s) 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 902 may be configured to access the memory 904 and execute the computer-executable instructions loaded therein. For example, the processor(s) 902 may be configured to execute the computer-executable instructions of the various program module(s), applications, engines, or the like of the computer system(s) 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to other illustrative components depicted as being stored in the data storage 920, the O/S 922 may be loaded from the data storage 920 into the memory 904 and may provide an interface between other application software executing on the computer system(s) 900 and the hardware resources of the computer system(s) 900. More specifically, the O/S 922 may include a set of computer-executable instructions for managing the hardware resources of the computer system(s) 900 and for providing common services to other application programs (e.g., managing memory allocation among various application programs). In certain example embodiments, the O/S 922 may control execution of the other program module(s). The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 900 is a mobile device, the DBMS 924 may be any suitable lightweight DBMS optimized for performance on a mobile device.

Referring now to other illustrative components of the computer system(s) 900, the input/output (I/O) interface(s) 906 may facilitate the receipt of input information by the computer system(s) 900 from one or more I/O devices as well as the output of information from the computer system (s) 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(s) 930 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 900 may further include one or more network interface(s) 908 via which the computer system(s) 900 may communicate with any of a variety of other systems, platforms, networks, devices, and so forth. The network interface(s) 908 may enable communication, for example, with one or more wireless routers, one or more host servers, one or more web servers, and the like via one or more networks.

The antenna(s) 930 may include any suitable type of antenna depending, for example, on the communications protocols used to transmit or receive signals via the antenna (s) 930. Non-limiting examples of suitable antenna(s) may include directional antenna(s), non-directional antenna(s), dipole antenna(s), folded dipole antenna(s), patch antenna (s), multiple-input multiple-output (MIMO) antenna(s), or the like. The antenna(s) 930 may be communicatively coupled to one or more transceivers 912 or radio components to which or from which signals may be transmitted or received.

As previously described, the antenna(s) 930 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 930 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 930 may be configured to transmit or receive radio frequency signals within any suitable frequency range forming part of the unlicensed portion of the radio spectrum.

The antenna(s) 930 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(s) 930—transmitting or receiving radio frequency (RF) signals in the bandwidth and/or channels corresponding to the communications protocols utilized by the computer system (s) 900 to communicate with other devices. The transceiver (s) 912 may include hardware, software, and/or firmware for modulating, transmitting, or receiving—potentially in cooperation with any of antenna(s) 930—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computer system(s) 900. The transceiver (s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 914 may be configured to output light and/or render content. The optional speaker(s)/microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module (s) depicted in FIG. 9 may be implemented, at least partially, in hardware and/or firmware across any number of devices.

It should further be appreciated that the computer system (s) 900 may include alternate and/or additional hardware, software, or firmware components beyond those described or depicted without departing from the scope of the disclosure. More particularly, it should be appreciated that software, firmware, or hardware components depicted as forming part of the computer system(s) 900 are merely illustrative and that some components may not be present or additional components may be provided in various embodiments. While various illustrative program module(s) have been depicted and described as software module(s) stored in the data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module (s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A shuttle rail system comprising:
- a container matrix;
- a track;
- a shuttle configured to deliver items to locations in the container matrix via the track; and
- a controller configured to:
  - determine a first location in the container matrix for a first item to be delivered by the shuttle;
  - determine that the shuttle is moving to the first location;
  - determine that the first item was not delivered at the first location;
  - cause the shuttle to be automatically routed to a problem solve station via the track;
  - determine, using metadata associated with the first item, that the first item is to be delivered to a first container at the problem solve station;
  - cause the shuttle to unload the first item at the first container; and
  - cause the shuttle to be routed to an induct station to induct a second item.

2. The shuttle rail system of claim 1, wherein the controller is further configured to:
- determine that the second item was not delivered;
- determine that the shuttle has a mechanical issue preventing unloading of the second item; and
- cause the shuttle to be automatically routed to a maintenance area via the track.

3. The shuttle rail system of claim 1, wherein the controller is configured to determine that the first item is to be delivered to the first container by:

selecting the first container from a set of containers, the set of containers comprising the first container that is associated with a first item problem category, and a second container associated with a second item problem category.

4. The shuttle rail system of claim 1, wherein the metadata comprises data associated with an operator input when the first item is loaded on the shuttle.

5. A system comprising:

a shuttle; and a controller configured to:

determine that the shuttle has a first item onboard, wherein the shuttle is configured to deliver the first item to a first location;

determine that the first item was not delivered to the first location;

cause the shuttle to be routed to a problem solve station;

determine a first container at which the shuttle is to unload the first item at the problem solve station; and cause the shuttle to unload the first item at the first container.

6. The system of claim 5, wherein the controller is further configured to:

cause the shuttle to be routed to an induct station to induct a second item.

7. The system of claim 5, wherein the controller is further configured to:

determine that the shuttle has a second item onboard;

determine that the second item was not delivered;

determine that the shuttle has a mechanical issue; and cause the shuttle to be routed to a maintenance area via the track.

8. The system of claim 7, wherein the controller is further configured to:

cause the shuttle to bypass a shuttle queue enroute to the maintenance area.

9. The system of claim 5, wherein the controller is further configured to:

determine that the shuttle is downstream from an item induct location; and determine a route to the problem solve station that passes through a container matrix.

10. The system of claim 5, wherein the controller is further configured to:

determine that the first item is associated with a high priority delivery notification; and cause the shuttle to bypass a shuttle queue enroute to the problem solve station.

11. The system of claim 5, wherein the controller is configured to determine the first container at which the shuttle is to unload the first item by:

selecting the first container from a set of containers, the set of containers comprising the first container that is associated with a first item problem category, and a second container associated with a second item problem category.

12. The system of claim 5, wherein the controller is further configured to:

determine metadata associated with the first item;

determine, using the metadata, that the first item is not to be delivered; and cause the shuttle to cancel delivery of the first item to the first location.

13. The system of claim 12, wherein the metadata comprises data associated with a manual input when the first item is loaded on the shuttle.

14. The system of claim 5, wherein the shuttle is configured to receive command data from the controller, and to move along a track to deliver items.

15. The system of claim 14, wherein the shuttle is further configured to detect an onboard issue with the shuttle locally.

16. A shuttle system comprising:

a controller configured to:

determine that the shuttle has a first item onboard, wherein the shuttle is configured to deliver the first item to a first location;

determine that the first item was not delivered to the first location;

cause the shuttle to be routed to a problem solve station;

determine a first container at which the shuttle is to unload the first item at the problem solve station;

cause the shuttle to unload the first item at the first container; and cause the shuttle to be routed to an induct station to induct a second item.

17. The shuttle system of claim 16, wherein the controller is further configured to:

determine that the shuttle has a second item onboard;

determine that the second item was not delivered;

determine that the shuttle has a mechanical issue; and cause the shuttle to be routed to a maintenance area via the track.

18. The shuttle system of claim 16, wherein the controller is further configured to:

determine that the shuttle is downstream from an item induct location; and determine a route to the problem solve station that passes through a container matrix.

19. The shuttle system of claim 16, wherein the controller is further configured to:

determine metadata associated with the first item;

determine, using the metadata, that the first item is not to be delivered; and cause the shuttle to cancel delivery of the first item to the first location.

20. The shuttle system of claim 16, wherein the shuttle is configured to receive command data from the controller, to move along a track to deliver items, and to detect an onboard issue with the shuttle locally.

* * * * *